2,896,203
Patented July 21, 1959

United States Patent Office

2,896,203
MOVING TARGET RADAR SYSTEMS

Peter Maurice Wright, Great Waltham, Chelmsford, and Noel Meyer Rust, Worthing, England, assignors to Marconi's Wireless Telegraph Company Limited, London, England, a British company Application February 20, 1953, Serial No. 337,985

4 Claims. (Cl. 343—7.7)

This invention relates to radar systems and more specifically to continuous wave (C.W.) radar systems i.e. to systems in which a continuous wave, the frequency of which is usually varied or modulated continuously and cyclically in a saw tooth or similar predetermined manner, is transmitted. Such systems, which are herein termed C.W. radar systems, are now very well known.

In the usual known C.W. radar systems the volume of space to be searched is scanned by a highly directional receiver whose azimuth and elevation are changed in order to enable it to explore the said volume. The ability of such a system to distinguish between two targets in different directions from the receiver (i.e. the directional resolution of the system) depends upon the cross-sectional area of the directional polar diagram of the receiver. The smaller the said cross-sectional area the greater the directional resolution and the smaller the volume of space covered by the receiver for any one position of azimuth and elevation. However the time necessary to build up a received echo signal from any one elemental volume of space is proportional to the integration time of the receiver proper, and this in turn is a function of receiver sensitivity, the smaller the integration time the smaller being the sensitivity. It follows therefore that in such a known system in which directional scanning is employed increase of directional resolution can only be achieved at the cost of an increase in the time taken to scan a given volume of space or a reduction in the integration time and therefore the sensitivity of the receiver, the latter normally involving an accompanying decrease in range resolution. Moreover, directional scanning must not be effected so quickly that the elemental volume (the volume covered by the receiver in any given position of azimuth and elevation) passes a target in less than the echo time, otherwise the echo signal will be missed altogether and, clearly, the sharper the receiver directivity the more serious this limitation which, in any event, is a seriously practical limitation in a long range radar. In addition the detection range of many radar systems is often materially reduced by the "fading" of echo signal strength. As such fading is usually too slow to allow the elemental volume of the receiver to include a target for a complete cycle of fading, this effect also often produces a serious reduction in performance.

The present invention seeks to overcome or reduce the foregoing defects and limitations of known C.W. radar systems, and this object is achieved, according to this invention in its broadest aspect, by providing a plurality of differently directed, high directional echo receivers which together cover a predetermined volume of space, continuously receiving upon said receivers, storing the signals received in a plurality of storing circuits or devices, and obtaining signals for display by collecting the stored signals in a predetermined sequence. As will be appreciated the fact that reception is continuous, the usual directional scanning being replaced by what is, in effect, the scanning of storage means, enables the hereinbefore mentioned defects and limitations to be avoided.

One form of radar system in accordance with the invention comprises means for continuously irradiating a desired volume of space with a frequency modulated continuous wave, a plurality of elemental, differently directed, directional echo receivers arranged to cover said volume, each receiver being adapted to derive echo signals in its own elemental volume, a plurality of signal storers, means for feeding echo signals from each receiver to a different storer, and means for exploring the storers in a predetermined sequence to derive signals for display.

The invention is of broad application and may be used in radar systems for displaying fixed or moving targets or both. Also the type of display used may take any of a variety of forms depending upon general design and operating requirements. For example the system may be such as to give any or all of the following displays:

(a) Range and azimuth co-ordinates of targets (e.g. so-called "P.P.I." and "B" displays)

(b) Range and elevation co-ordinates of targets (so-called "R.H.I." display)

(c) Azimuth and elevation co-ordinates of targets (so-called "C" display)

(d) Target velocity and range, azimuth or elevation (target velocity being obtained by using Doppler shift frequencies).

As radar systems capable of giving the foregoing displays are well known and, in carrying out the present invention, the same known principles are employed, the present invention being concerned only with the elimination of directional scanning in space, it is not thought necessary in this specification to describe embodiments for all these possibilities. The following particular description is therefore limited to a description of the application of the invention to a radar system adapted to pick-up and display moving targets only, the system chosen for exemplification given a co-ordinate display of range and azimuth. This chosen system is illustrated schematically in the accompanying drawings, in which:

Figure 2:
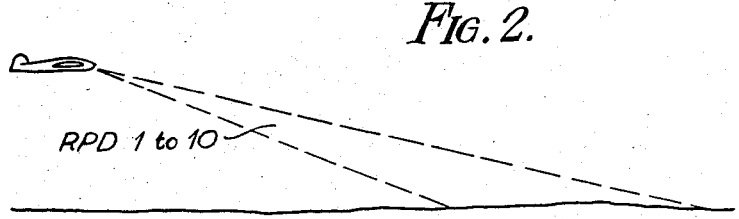
Figure 2 is a schematic showing in elevation of a fan shaped beam produced by use of the invention as in an airborne system.
Figure 3:
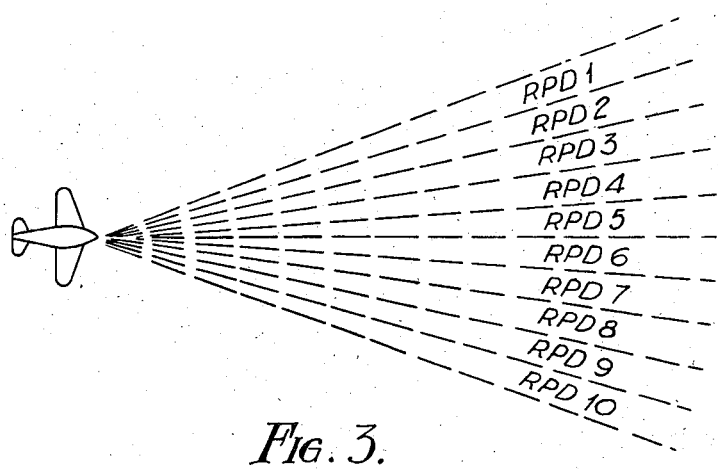
Figure 3 is a schematic showing corresponding to Figure 2, but in plan.

The illustrated system is of the so-called synchronous range gate type i.e. the known type in which the full range of the system is searched out by varying the cycle repetition of a frequency modulated transmitter, a target being indicated when its echo time is the same as the said cycle repetition frequency. More in detail the frequency of a frequency modulated transmitter T is varied in accordance with a saw tooth law as indicated at (a) which represents transmitted frequency (ordinates) against time (abscissae). As will be seen from curve (a) the cycle repetition frequency—i.e. the saw tooth frequency—is varied continuously cyclically and at a predetermined rate by any convenient control circuit or device at STC between limits which correspond to the maximum and minimum target ranges for which the system is designed, the cycle repetition periods at these limits being the same as the corresponding echo times. In addition a manually operable control circuit RTC adapted to vary the amplitude of the saw tooth to produce a saw tooth exemplified by the broken curve (b) is also provided. The output from T is fed to a transmitter horn TH which, in conjunction with a feed shaping lens FSL and a main lens ML, sends out a wide beam which irradiates a desired volume in space e.g. as indicated a sector. The polar diagram of the transmitted radiation may conveniently be as conventionally shown at TPD with somewhat increased strength at the edges to compensate for the reduced receiver sensitivity normally experienced there. Reception is effected by a plurality of receiver horns (ten are indicated) RH1 to RH10 which, in conjunction with a suitable receiving lens RL provide a receiving polar diagram covering the volume irradiated by the transmitter and made up of ten contiguous or slightly overlapping directional diagrams RPD1 to RPD10. An installation as now being described might be conveniently employed as an airborne system, the volume covered being that of a fan shaped "beam" as indicated in elevation in Figure 2 and in plan in Figure 3. Each receiving horn RH1 to RH10 feeds into its own channel but, in order to simplify Figure 1, only one complete channel (for the horn RH1) is shown. All the others are, however, similar. The channel from horn RH1 includes a mixer M1 to which energy from the transmitter T is directly supplied. This mixer feeds into a Doppler note amplifier-selector D1. This is a band pass amplifier which, in some cases may be of fixed centre frequency and of band width determined by the maximum and minimum speeds of the targets to be detected, or, in other cases may be of variable centre frequency and variable band width, adjustable over the frequency spectrum due to a "range" of targets moving at different speeds. This variability is indicated by the arrow on the rectangle D1. As is known there will be an uninterrupted Doppler note from amplifier-selector D1 if a target echo is received from a target when the transmitter cycle repetition frequency is exactly equal to the echo time of that target. The output from D1 is fed to a storage circuit or device S1 represented as comprising a rectifier SD1, a storage condenser SC1 and adjustable shunt and series resistances SR1. Stored signals set up across condenser SC1 are fed to a contact K1 of a multiple contact switch having ten contacts K1 to K10. Each of these contacts is fed through its own similar channel (like that to contact K1) from its own receiving horn. A switch arm SW can be swept across the contacts to explore them sequentially and collect the stored signals. In practice the scanning switch, as it may be termed, shown as comprising the arm SW and contacts K1 to K10 would be an electronic distributor switch as known per se but, for simplicity in drawing, it is represented as though it were a mechanical device.

Figure 1:
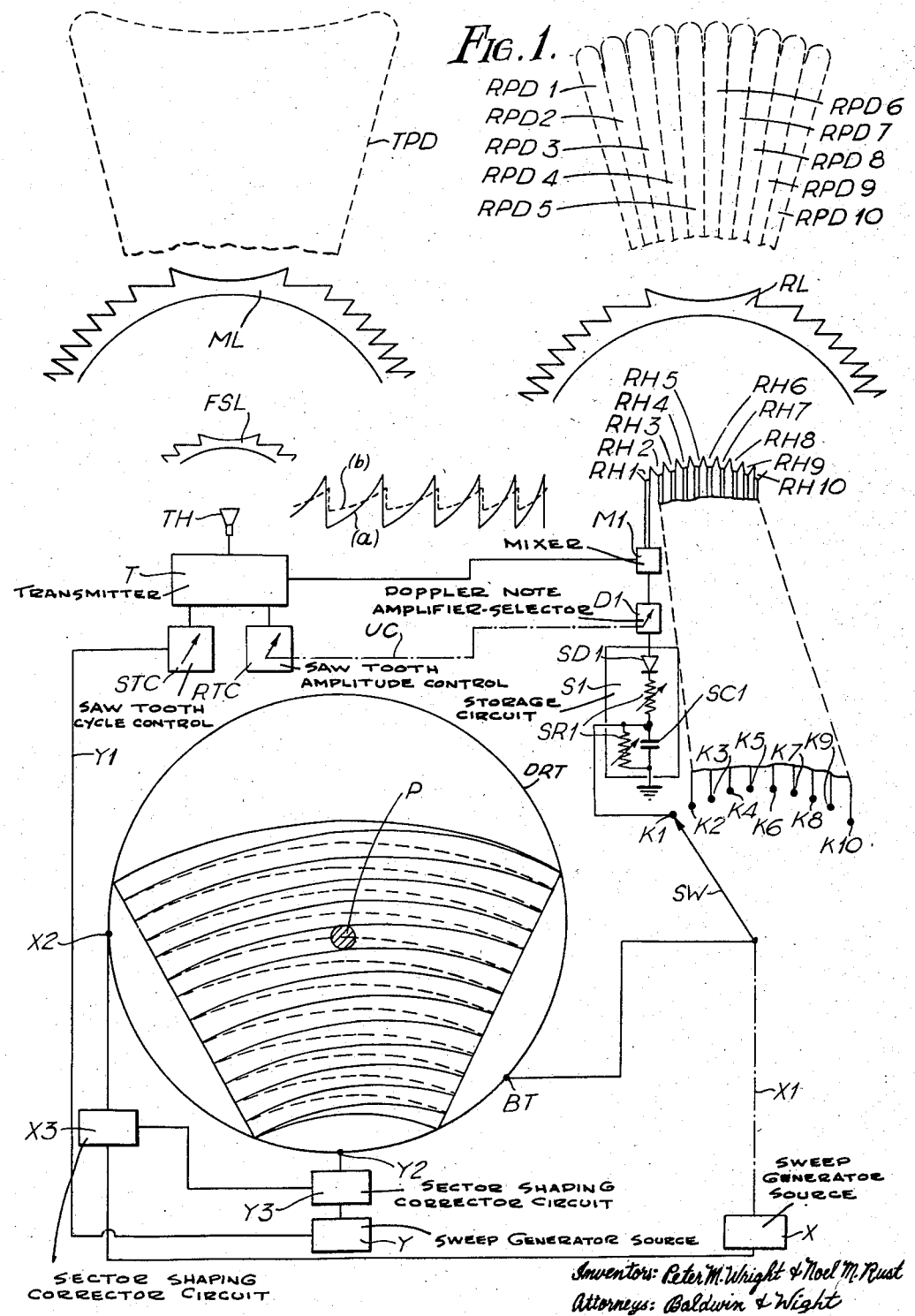
Figure 1 is a diagrammatic representation of an apparatus or installation embodying the invention.

The display device is a cathode ray tube DRT whose screen is represented in Figure 1. Deflection in the X direction of the tube is obtained by a sweep generator source X which also produces movement of the arm SW as indicated by the chain line X1, the X deflection being applied to the X deflector terminal X2 through a sector shaping corrector circuit X3. Deflection in the Y direction is obtained by a sweep generator source Y which is controlled by the saw tooth control circuit STC over lead Y1 and which applies Y deflection to the terminal Y2 through a sector shaping corrector circuit Y3. Ignoring for the moment the effect of the shaping circuits X3 and Y3 the generators X and Y would produce a rectangular raster on the tube screen, the raster being composed of lines in the X direction successively displaced in the Y direction. The X deflection is synchronised with the sweep of the arm SW and the Y deflection with the unit STC so that the co-ordinates of any spot on the tube (the spot is represented at P) define the horn (RH1 to RH10) to whose storage circuit the arm SW is connected (the X coordinate) and the range (the Y co-ordinate) to which the transmitter cycle repetition frequency corresponds. The correctors X3 and Y3 are simply amplitude correctors for transforming what would be a rectangular raster of straight lines into a sector shaped one of arcuate lines as shown. The circuits X and Y are interconnected. Clearly to transform the rectangle into the sector, the corrector X3 must increase the X amplitude linearly from a minimum when the Y deflection is zero to a maximum when the Y deflection is at a maximum and the corrector Y3 must cause the Y deflection to be at a maximum (for any given line) at the mean value of the X deflection and to fall away to a minimum at zero and maximum values of the X deflection. Signals from the arm SW are fed to the control electrode terminal BT of the tube. Thus, if any spot appears on the screen its position in the X direction defines the polar diagram RPD1 to RPD10 in which the target lies and its position in the Y direction defines the target range. The speed of the X sweep and therefore the arm SW may be of any value within fairly wide limits, but it must be slow enough to permit any received echo to build up a proper signal in the appropriate storage device.

A uni-control link between the control unit RTC and the variable Doppler amplifier selector D1 is indicated by the chain line UC. (All the selectors D1 to D10 are controlled together, of course.) This control is operated to change the range resolution and is necessary if range resolution adjustment is required and the number of "paints" per unit of time is to be constant, as is assumed here. Reduction of the frequency deviation—i.e. the amplitude of the saw tooth (a)—increases (i.e. degrades) the range resolution (which varies with the reciprocal of transmitter frequency deviation) and involves a shift of the band-pass of the selector-amplifiers D1 to D10 in accordance with known principles.

In Figure 1 it is assumed that the X deflection is of the saw tooth type with outward excursions and practically instantaneous flyback, the flyback being suppressed in known manner as indicated by broken lines on the raster.

We claim:

1. A C.W. radar system for picking up moving targets and ascertaining and displaying the range and azimuth thereof, said system comprising a frequency modulated transmitter adapted to irradiate a predetermined volume of space with continuous waves; means for cyclically modulating the frequency of said transmitter in accordance with a predetermined cyclic law of frequency variation; a plurality of directional receivers adapted between them to cover said volume, said receivers having adjacent directional diagrams; a received signal channel fed each from a different receiver, each channel including a mixer for mixing received signals with energy direct from the transmitter, a Doppler note amplifier-selector adapted to provide an output consisting of an uninterrupted Doppler note when a target echo is present from a target whose echo time is exactly the same as the modulation cycle of the transmitter, a storage circuit fed from said amplifier selector, and an output terminal fed from said storage circuit; means for scanning said output terminals to collect signals sequentially therefrom; a display cathode ray tube; means for deflecting the ray in said tube in one direction in synchronism with said scanning means; means for deflecting said ray in the co-ordinate direction in synchronism with the cyclic modulating means; and means for applying signals picked up by scanning said terminals to brighten said ray.

2. A C.W. radar system for picking up moving targets and ascertaining and displaying the range and azimuth thereof, said system comprising a frequency modulated transmitter adapted to irradiate a predetermined volume of space with continuous waves; means for cyclically modulating the frequency of said transmitter in accordance with a predetermined cyclic law of frequency variation; a plurality of directional receivers adapted between them to cover said volume, said receivers having adjacent directional diagrams; a received signal channel fed each from a different receiver, each channel including a mixer for mixing received signals with energy direct from the transmitter, a Doppler note amplifier-selector adapted to provide an output consisting of an uninterrupted Doppler note when a target echo is present from a target whose echo time is exactly the same as the modulation cycle of the transmitter, a storage circuit fed from said amplifier selector, and an output terminal fed from said storage circuit; means for scanning said output terminals to collect signals sequentially therefrom; a display cathode ray tube; means for deflecting the ray in said tube in one direction in synchronism with said scanning means; means for deflecting said ray in the co-ordinate direction in synchronism with the cyclic modulating means; means for applying signals picked up by scanning said terminals to brighten said ray; means for linearly increasing the amplitude of deflection in said one direction from a minimum when the deflection in the other direction is zero to a maximum when said deflection in said other direction is a maximum; and means for causing the deflection in said other direction to be of maximum amplitude when the deflection in said one direction is at its mean amplitude value and to fall away to a minimum when the deflection amplitude in said one direction is at maximum and zero amplitude values.

3. A C.W. radar system for picking up moving targets and ascertaining and displaying the range and azimuth thereof, said system comprising a frequency modulated transmitter adapted to irradiate a predetermined volume of space with continuous waves; means for cyclically modulating the frequency of said transmitter in accordance with a predetermined cyclic law of frequency variation, said cyclic law being a saw tooth law; a plurality of directional receivers adapted between them to cover said volume, said receivers having adjacent directional diagrams; a received signal channel fed each from a different receiver, each channel including a mixer for mixing received signals with energy direct from the transmitter, a Doppler note amplifier-selector adapted to provide an output consisting of an uninterrupted Doppler note when a target echo is present from a target whose echo time is exactly the same as the modulation cycle of the transmitter, a storage circuit fed from said amplifier selector, and an output terminal fed from said storage circuit; means for scanning said output terminals to collect signals sequentially therefrom; a display cathode ray tube; means for deflecting the ray in said tube in one direction in synchronism with said scanning means; means for deflecting said ray in the co-ordinate direction in synchronism with the cyclic modulating means; and means for applying signals picked up by scanning said terminals to brighten said ray.

4. A C.W. radar system for picking up moving targets and ascertaining and displaying the range and azimuth thereof, said system comprising a frequency modulated transmitter adapted to irradiate a predetermined volume of space with continuous waves; means for cyclically modulating the frequency of said transmitter in accordance with a predetermined cyclic law of frequency variation, said cyclic law being a saw tooth law; a plurality of directional receivers adapted between them to cover said volume, said receivers having adjacent directional diagrams; a received signal channel fed each from a different receiver, each channel including a mixer for mixing received signals with energy direct from the transmitter, a Doppler note amplifier-selector adapted to provide an output consisting of an uninterrupted Doppler note when a target echo is present from a target whose echo time is exactly the same as the modulation cycle of the transmitter, a storage circuit fed from said amplifier selector, and an output terminal fed from said storage circuit; means for scanning said output terminals to collect signals sequentially therefrom; a display cathode ray tube; means for deflecting the ray in said tube in one direction in synchronism with said scanning means; means for deflecting said ray in the co-ordinate direction in synchronism with the cyclic modulating means; means for applying signals picked up by scanning said terminals to brighten said ray; means for linearly increasing the amplitude of deflection in said one direction from a minimum when the deflection in the other direction is zero to a maximum when said deflection in said other direction is a maximum; and means for causing the deflection in said other direction to be of maximum amplitude when the deflection in said one direction is at its mean amplitude value and to fall away to a minimum when the deflection amplitude in said one direction is at maximum and zero amplitude values.

References Cited in the file of this patent
UNITED STATES PATENTS

| | | |
|---|---|---|
| 2,422,295 | Eaton | June 17, 1947 |
| 2,433,332 | Benioff | Dec. 30, 1947 |